United States Patent [19]
Yoshida et al.

[11] Patent Number: 5,122,425
[45] Date of Patent: Jun. 16, 1992

[54] ELECTROLYTE/ELECTRODE ASSEMBLY FOR A SOLID ELECTROLYTE FUEL CELL

[75] Inventors: Shizuyasu Yoshida; Hitoshi Shimizu; Shin'ichi Maruyama, all of Kawasaki, Japan

[73] Assignee: Fuji Electric Co., Ltd., Kanagawa, Japan

[21] Appl. No.: 769,434

[22] Filed: Oct. 2, 1991

[30] Foreign Application Priority Data

Oct. 3, 1990 [JP] Japan .................................. 2-265544
Sep. 24, 1991 [JP] Japan .................................. 3-272074

[51] Int. Cl.⁵ .................................................. H01M 8/10
[52] U.S. Cl. .................................. 429/33; 429/41; 429/44
[58] Field of Search ................ 429/30, 33, 40, 41, 429/44, 42, 191, 193

[56] References Cited

U.S. PATENT DOCUMENTS

| | | | |
|---|---|---|---|
| 4,052,532 | 10/1977 | Tannenberger et al. | 429/33 |
| 4,142,024 | 2/1979 | Vanden Berghe et al. | 429/33 X |
| 4,562,124 | 12/1985 | Ruka | 429/30 |
| 4,950,562 | 8/1990 | Yoshida et al. | 429/32 |

*Primary Examiner*—Anthony Skapars
*Attorney, Agent, or Firm*—Spencer, Frank & Schneider

[57] ABSTRACT

An electrolyte/electrode assembly for a solid electrolyte fuel cell includes a pair of flat electrodes spaced from one another and a solid electrolyte element sandwiched between the electrodes. A porous matrix having one side and comprising at least one chemical constituent which provides the porous matrix with a coefficient of thermal expansion corresponding to the coefficient of thermal expansion of the solid electrolyte element, has one of the flat electrodes formed on or within the one side of the porous matrix. An electrically conductive material is supported in the porous matrix for providing an electrical conductivity in the porous matrix in the direction of thickness of the flat electrodes.

8 Claims, 5 Drawing Sheets

10 μm

ELECTROLYTE/ELECTRODE ASSEMBLY FOR A SOLID ELECTROLYTE FUEL CELL

CROSS REFERENCE TO RELATED APPLICATIONS

The present application claims the rights of priority of Japanese Patent Application No. 2-265544, filed in Japan on Oct. 3, 1990, and Japanese Patent Application filed in Japan on Sep. 24, 1991, the subject matter of both applications being incorporated herein by reference.

BACKGROUND OF THE INVENTION

The present invention relates to an electrolyte/electrode assembly used in a solid electrolyte fuel cell, and more particularly, to a so-called substrate structure type of electrolyte/electrode assembly in which a thin, flat solid electrolyte element and thin, flat electrodes are applied to a thick porous substrate.

A solid electrolyte fuel cell is a fuel cell which uses a solid electrolyte element, such as solid zirconia, to operate the fuel cell at high temperatures, for example, temperatures ranging between about 800° and about 1000° C. Compared to other known types of fuel cells, the solid electrolyte fuel cell has no problems caused by retention and corrosion of the electrolyte and eliminates the need for a catalyst to reduce any activating overvoltage during operation.

Two types of planar fuel cells have been developed. One is a conventional thin tri-layer (anode/electrolyte/cathode) design which is called a self-supported structure. The other is a new design which is called a substrate structure, in which, a thin, flat, solid electrolyte element and a thin, flat cathode are applied to a thick, porous anode substrate. The self-supported structure has a higher power density than the substrate structure because the thick substrate of the substrate structure hinders gas diffusion, which restricts current density. The thin electrode of the self-supported structure does not hinder gas diffusion. Its thin structure, however, is mechanically too weak to permit large cell areas, and the maximum electrolyte plate size is limited to about 20 × 20 cm with a thickness of 0.2 to 0.3 mm. Therefore, the self-supported structure is restricted to military or space applications where small, compact, high power density is required.

On the other hand, the substrate structure permits the fabrication of a large electrolyte plate because the thick anode can support the large but thin electrolyte plate. Electrolyte plates as large as 40 × 40 cm can be obtained with 2 to 3 mm thick anodes, although the power density will be lower than that of similar self-supported structures for the reasons given above. Therefore, a large electrolyte plate makes it possible to construct large capacity fuel cells, which allows the substrate structure to be extended to application in power plants for dispersed or central power stations. Some problems nevertheless remain to be solved in this regard.

FIG. 1 is an exploded view of a conventional electrolyte/electrode assembly of a substrate structure type fuel cell. In this assembly, a thin, flat electrolyte 2 and thin, flat cathode 3 are applied to a thick anode substrate 1. An alternate design using a thick porous cathode as a cathode substrate is available if the porous cathode is mechanically strong. Anode substrate 1, serving also as an anode, is a porous substrate with ribs and consisting of an electrolyte such as zirconia. An electrically conductive material consisting of nickel or nickel-zirconia cermet is supported in the porous substrate in order to provide electrical conductivity to anode substrate 1 in the direction of the thickness of the anode substrate. Cathode 3 consists of lanthanum manganite, $LaMnO_3$. Usually, yttria-stabilized zirconia, YSZ, is used for solid electrolyte element 2.

The electrolyte/electrode assembly thus obtained is assembled with a ribbed interconnection shown FIG. 1 to construct a unit cell. Interconnection is formed by a cathode substrate 4 consisting of $LaMnO_3$ and a separator 5 consisting of $La(Ca)CrO_3$. Separator 5 is formed in a layer doped with calcium on cathode substrate 4. A fuel cell stack is fabricated in a known manner by alternating the above mentioned electrolyte/electrode assemblies and the separator in sequence and by attaching fuel and air manifolds to the sides of the stack.

Conventionally, anode substrate 1 and cathode substrate 4 are made of nickel-zirconia oxide, NiO-YSZ, powder, and lanthanum manganite, $LaMnO_3$, powder, as the raw materials for the respective parts. There parts are formed by pelletizing molding, sheet molding, extrusion molding or cold isostatic pressing (CIP), and by sintering under an oxidizing or reducing atmosphere. Usually, the NiO-YSZ anode substrate is reduced inside a fuel cell by flowing a fuel gas during the operation.

The NiO-YSZ anode substrate undergoes a five to six percent volume contraction due to the reduction. This contraction is observed even when the Ni content is lowered to approximately 30% by volume at which point electrical conductivity can be assured during the reduction. A problem that arises is that when a dense YSZ solid electrolyte layer is formed on this NiO-YSZ anode substrate, the YSZ layer develops cracks because of the changes in NiO volume during the reduction, which eventually result in warpage and cracking in the electrode substrate itself. Furthermore, in the case of an NiO-YSZ anode substrate with a diameter of at least 100 mm, the substrate itself also develops cracks by simply forming the YSZ layer. This indicates that the porous anode substrate is incapable of absorbing the difference between the coefficient of thermal expansion in NiO-YSZ of $(12-14) \times 10^{-6}$ °C. (30°–1000° C., in air) and the coefficient of thermal expansion in the solid electrolyte element, YSZ of $10.5 \times 10^{-6}$/°C.

The above mentioned contraction is also observed when the cathode is utilized as the substract for the electrolyte. The $LaMnO_3$ cathode substrate also develops large volume contractions. When a dense YSZ layer is formed on this $LaMnO_3$ cathode substrate, the YSZ solid electrolyte layer develops cracks because of the changes in $LaMnO_3$ volume, which eventually result in warpage and cracking in the electrode substrate itself. This indicates that the porous cathode substrate is incapable of absorbing the difference between the coefficient of thermal expansion in $LaMnO_3$ of $12 \times 10^{-6}$/°C. (30°–1000° C., in air) and the coefficient of thermal expansion in the solid electrolyte element, YSZ, of $10.5 \times 10^{-6}$/°C.

SUMMARY OF THE INVENTION

It is an object of the present invention to resolve the above problems and thus provide an electrolyte/electrode assembly with no cracks by forming an electrode substrate which is thermally compatible with the solid electrolyte element in the unit.

The above and other objects are achieved according to the invention by the provision of an electrolyte/electrode assembly for a solid electrolyte fuel cell including a pair of flat electrodes spaced apart from one another, a solid electrolyte element sandwiched between the electrodes, the solid electrolyte element being comprised of at least one chemical constituent which provides the solid electrolyte element with a predetermined coefficient of thermal expansion, a porous matrix having one side and comprising at least one chemical constituent which provides the porous matrix a coefficient of thermal expansion corresponding to the coefficient of thermal expansion of the solid electrolyte element, one of the flat electrodes being formed on or within the one of side of the porous matrix, and an electrically conductive material supported in the porous matrix for providing an electrical conductivity in the porous matrix in the direction of thickness of the flat electrodes.

By optimizing the composition of the electrode substrate to comprise at least one of the same chemical constituent(s) as the solid electrolyte and an electrically conductive material, the electrode substrate can be thermally matched to the solid electrolyte element in the unit cell while raising the conductivity of the electrode substrate.

The above and other objects, effects, features and advantages of the present invention will become more apparent from the following description of embodiments thereof taken in conjunction with the accompanying drawings.

BRIEF DESCRIPTION OF THE DRAWINGS

Further advantages of the invention will be apparent from a reading of the following description in conjunction with the accompanying drawings.

DETAILED DESCRIPTION OF PREFERRED EMBODIMENTS

Figure 1:
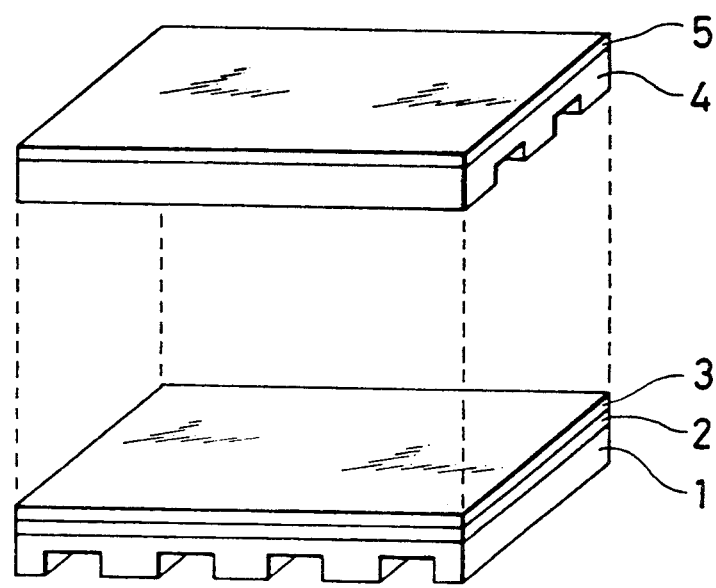
FIG. 1 is an exploded, perspective view of a conventional electrolyte/electrode assembly of a substrate structure type fuel cell.
Figure 2:
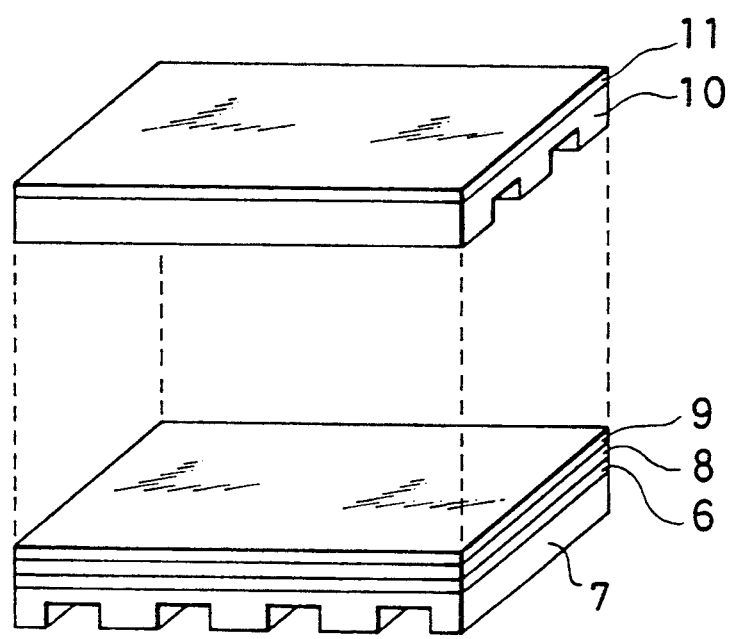
FIG. 2 is an exploded, perspective view of an electrolyte/electrode assembly of a substrate structure type fuel cell according to one embodiment of the present invention.

FIG. 2 shows an exploded, perspective view of an electrolyte/electrode assembly for a fuel cell with a substrate structure according to one embodiment of the present invention. In this embodiment a flat anode substrate 7 is formed by machining internal ribs on one side of a 4 mm thick, porous NiO-YSZ cermet matrix, which is made by cold pressing followed by sintering as later described. The porous matrix consists of zirconia either partly or completely stabilized by yttria or magnesia and electrical conductors consisting of nickel-zirconia cermet supported in the porous matrix. The electrically conductive material provides an electrical conductivity to the porous matrix in the direction of the thickness of the anode substrate. A flat anode 6 is formed on the flat side of anode substrate 7. Anode 6 is comprised of nickel oxide, NiO and 8 mol% yttria-stabilized zirconia, YSZ, in a weight ratio of 2:1, and polyvinyl butyral, PVB, as binder. The PVB is dissolved in ethanol and the ingredients are wet-mixed. The slurry thus obtained is applied to anode substrate 7 and sintered at 1400° C. to form the flat anode 6 on anode substrate 7. YSZ is continuously plasma sprayed at a reduced pressure on to anode 6 to form a solid electrolyte element 8. A flat cathode 9 is formed by application of a lanthanum manganite, $LaMnO_3$, coating thereon followed by sintering at 1200° C. A cathode substrate 10 is prepared by pressing and sintering the same $LaMnO_3$ that is used in the cathode. Its porosity is about 30%, and the average pore size is about 3 $\mu$m.

The electrolyte/electrode assembly thus obtained is assembled with a ribbed interconnection shown in FIG. 2 in order to constitute a unit cell. Cathode substrate 10 is covered with a separator 11 comprising lanthanum calcium chromite, $La_{0.7}Ca_{0.3}CrO_3$, which is plasma sprayed at a reduced pressure over the porous matrix of cathode substrate 10. A fuel cell stack is fabricated by alternating electrolyte/electrode assemblies and interconnections in sequence and by attaching fuel and air manifolds to the side of the stack as is known in the art.

Manufacturing methods for the electrode substrate according to the invention are explained in more detail by way of the following examples.

EXAMPLE 1

First, the following coarse zirconia powder is obtained as the matrix substrate: 8 mole % yttria stabilized zirconia YSZ, is granulated with a spray dryer and is provisionally sintered for two hours in air at about 1500° C. It is then pulverized and passed through a sieve with openings of about 300 $\mu$m to obtain a coarse zirconia powder. The average grain size of the coarse powder obtained is within a range of about 50 to 100 $\mu$m.

Next, a coarse electrically conductive material is granulated as follows: NiO and 8 mole % yttria stabilized zirconia YSZ are weighed in 2:1 proportion by weight, and are wet-mixed into a solution of polyvinyl butyral, PVB, and polyetheylene glycol, PEG, in ethanol as binders. The coarse YSZ powder mentioned above is added to the mixture, further wet-mixed, left standing, and then heated and dried. The powder thus obtained is put into a die, which is pressed for one to three minutes at room temperature at a pressure of about 1 ton/$cm^2$ to make a disc. The disc is pulverized coarsely using a stamp mill or cutter mill, passed through a sieve with openings of about 300 $\mu$m, and granulated. The grains thus obtained are provisionally sintered for two hours in air at about 1300° C., and the sintered grains are further passed through a sieve with openings of about 300 $\mu$m. The coarse powder thus obtained is added to an aqueous solution of polyvinyl alcohol, PVA, and polyethylene glycol, PEG, as binders, stirred, and then heated and dried. The powder added with the binders is further passed through a sieve with openings of about 300 $\mu$m. The sieved powder is put into a die are uniaxially pressed for from one to three minutes at room temperature at a pressure of from about 300 to about 500 kg/$cm^2$ to change the powder into a substrate, which is then sintered for two hours in air at a temperature of about 1500° C. In this way, an anode substrate is obtained with a diameter of about 130 mm and a thickness of about 4 mm, in which NiO-YSZ cermet as electrically conductive material is supported in the porous matrix consisting of $Y_2O_3$ stabilized $ZrO_2$ (YSZ).

Figure 3:
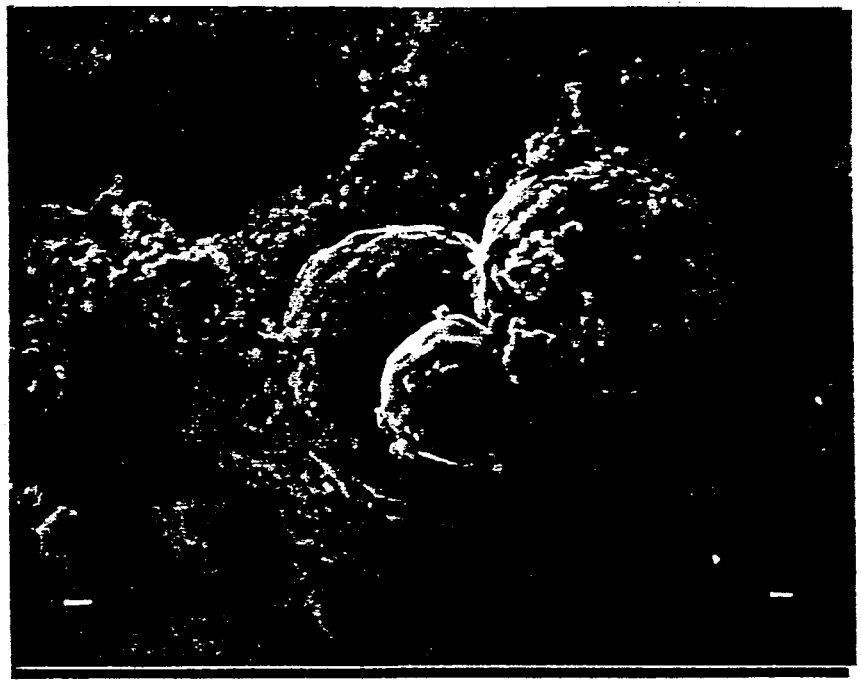
FIG. 3 illustrates the crystal structure of the anode substrate according to an embodiment of the present invention, as viewed through a scanning electron microscope.

FIG. 3 illustrates the crystal structure of an anode substrate made according to the above, as observed under a scanning electron microscope. The fine powder of the electrical conductors consisting of nickel-zirconia cermet is dispersed and supported in clearances in the matrix of the zirconia coarse powder. The nickel paths that ensure electrical conductivity in the anode substrate are cut off resulting in increased specific resistance if the average grain size of fine NiO-YSZ powder exceeds about 10 μm. On the other hand, a porous matrix cannot be obtained when the fine grain is sintered if the average grain size of fine NiO-YSZ powder is less than about 0.1 μm. Therefore, the grain size range of NiO-YSZ must be maintained from about 0.1 μm to about 10 μm.

Although, in the above-mentioned Example, anode 6 is formed over anode substrate 7 as another layer, anode 6 may be omitted to simplify the manufacturing process since anode substrate 7 already includes the functions of an anode. That is, anode 6 is already formed within anode substrate 7. The manufacturing process is continued with an 8 mole % $Y_2O_3$ stabilized $ZrO_2$ (YSZ) electrolyte being plasma sprayed directly on the Ni-O-YSZ anode substrate obtained as above described in a thickness ranging from about 100 to about 200 μm, and then a $LaMnO_3$ cathode layer is applied to the electrolyte. An electrolyte/electrode assembly, in which the anode substrate includes the functions of an anode, is thus obtained.

EXAMPLE 2

Magnesia-stabilized zirconia, MSZ, consisting of a coarse zirconia powder, partly stabilized by magnesia, MgO, of 9 mole % is provisionally sintered for about two hours at about 1600° C., passed through a sieve with openings of about 300 μm, and granulated to an average grain size range between about 50 and about 100 μm. Using the same processes as mentioned in Example 1, an anode substrate 7 is obtained with a diameter of about 130 mm and a thickness of about 3 mm, in which NiO-YSZ cermet as electrically conductive material is supported in the porous matrix consisting of MgO stabilized $ZrO_3$.

The average linear thermal expansion coefficient of nickel oxide, NiO, is about $15 \times 10^{-6}$/°C. in air, from room temperature to about 1000° C., while the thermal expansion coefficient of MSZ is about $9 \times 10^{-6}$/°C. in the same temperature range. Therefore, it is possible to have the thermal expansion coefficient of the anode substrate matched by the thermal expansion coefficient of $10.5 \times 10^{-6}$/°C. of the yttria-stabilized zirconia, YSZ, which is the solid electrolyte element, by adding the proper amount of MSZ into the NiO.

Figure 4:
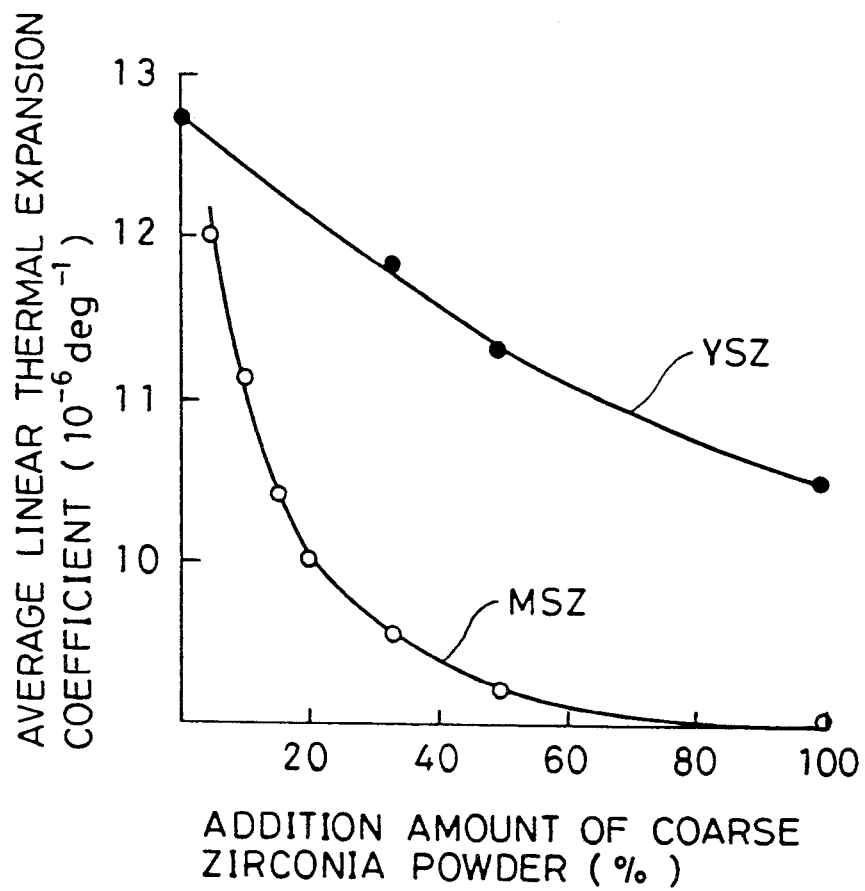
FIG. 4 is a graph showing the relationship between added amounts of coarse YSZ or MSZ powder to the anode substrate and the thermal expansion coefficient of the anode substrate.

FIG. 4 is a graph showing the relationship of specific resistance to the amount of coarse YSZ or MSZ powder added to the anode substrate. While in NiO-YSZ without the addition of coarse powder, the thermal expansion coefficient is about $13 \times 10^{-6}$/°C., the coefficient can be reduced to about $11.4 \times 10^{-6}$/°C. by adding 50 mole % of coarse YSZ powder. On the other hand, the thermal expansion coefficient of the coarse MSZ powder can be matched with that of YSZ by adding about 10 to about 20% of coarse YSZ powder.

Figure 5:
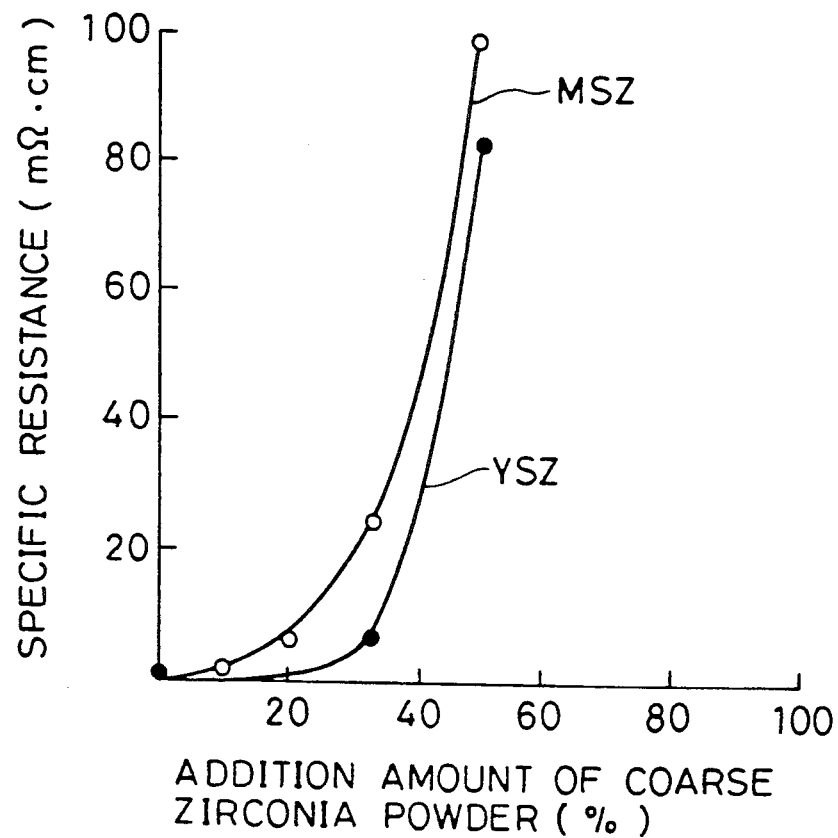
FIG. 5 is a graph showing the relationship between added amounts of coarse YSZ or MSZ powder to the anode substrate and the resistivity of the anode substrate.

FIG. 5 shows the relationship between the added amount of coarse YSZ and MSZ powder to the anode substrate and the specific resistance of the anode substrate. An increase in the specific resistance due to the addition of MSZ tends to be slightly greater than that due to the addition of YSZ, but both YSZ and MSZ result in a specific resistance of about 50 mΩ.cm or lower when the added amount of YSZ or MSZ is within about 40 mole %. The voltage drop due to such resistance is negligible during operation of the fuel cell. Therefore, as long as the added amount of coarse zirconia powder is within a range of about 5 to about 40%, a thermal consistency with YSZ can be achieved with the specific resistance remaining at a low value.

EXAMPLE 3

Nickel oxide, NiO, and yttria-stabilized zirconia, YSZ, are weighed in a weight ratio of 2:1, and added to a solution of PVB, PEG, and dioctyl phthalate as binders in a mixed solvent of 60% toluene and 40% isopropyl alcohol by weight. The ingredients are wet-mixed in a ball mill to prepare an electrically conductive material.

A porous matrix comprised of zirconia felt is immersed in an aqueous solution of the NiO-YSZ, and then deaerated for from about ten to about thirty minutes under a pressure of approximately 160 mm Hg in a vacuum glove box. The matrix is then removed from the box, placed on a polyester film, and is continually dried in the glove box. The matrix is then sintered for about two hours in air at a temperature of about 1500° C. to obtain an anode substrate 7 with a diameter of about 130 mm and a thickness of about 3 mm. In this way, an anode substrate is obtained in which NiO-YSZ cermet as an electrically conductive material is supported in the porous matrix consisting of $Y_2O_3$ stabilized $ZrO_2$. Other materials can be used for the zirconia matrix in lieu of felt, such as sponges, honeycombs, clothes and screens.

The same specific resistance and thermal matching with YSZ as in Example 2 are also possible in this Example 3 by introduction of a zirconia matrix.

Although the electrolyte is applied to the anode substrate in the above mentioned examples, an alternate design using the flat side of the cathode substrate is feasible according to the present invention as will be apparent from the following Example 4.

EXAMPLE 4

A cathode substrate 10 is prepared as follows: lanthanum oxide, $La_2O_3$, and manganese carbonate, $MnCO_3$, are weighed in amounts sufficient to constitute $LaMnO_3$. In order to increase the electrical conductivity of $LaMnO_3$, strontium carbonate, $SrCO_3$, is added to obtain lanthanum manganite doped with strontium. The resultant mixture is provisionally sintered for about three hours in air at a temperature of about 1400° C. The product is pulverized for about 24 hours in a ball mill. After verifying with the X-ray diffraction process that the resultant powder has a perovskite structure, coarse YSZ powder is added as in Example 1, and polyvinyl alcohol, PVA, dissolved in water is also added as a binder, and then stirred and dried. The powder, including the binder, is screened through a sieve with openings of about 300 μm to obtain a raw material powder. The raw material powder is put into a die and is uniaxially pressed for from about one to about three minutes at a normal temperature under a pressure ranging from about 500 to about 1000 kg/cm$^2$. The formed product is sintered for about five hours in air at a temperature of about 1350° C. Thus, the cathode substrate 10 is obtained with a diameter of about 130 mm and a thickness of about 4 mm, in which an electrically conductive material comprised of lanthanum manganite is supported in the porous matrix consisting of zirconia either partly or completely stabilized.

The average linear thermal expansion coefficient of $La_{0.85}Sr_{0.15}MnO_3$, without the addition of coarse zirconia powder was about $11.1 \times 10^{-6}/°C$, in air at temperatures ranging from room temperature to about 1000° C. On the other hand, by adding 10% of coarse YSZ powder, a cathode substrate 10 is obtained with a thermal expansion coefficient of $10.7 \times 10^{-6}/°C$. After that, plasma spraying of YSZ at a reduced pressure as a solid electrolyte element was done, with no resulting warpage or cracks in the substrate.

Therefore, by introducing a zirconia matrix in the cathode side, an electrolyte/electrode assembly having thermal consistency with YSZ can be obtained.

According to the present invention, the electrically conductive material is supported in a porous matrix that consists of the same main constituents as the solid electrolyte element. Even if the electrically conductive material changes physically because of oxidation or reduction, the electrode substrate as a whole remains mechanically stable because the supporting element, i.e., the porous matrix, is stable. In addition, the electrical conductivity of the electrode substrate is raised by optimizing the composition of the electrode substrate consisting of a porous matrix and electrically conductive material, with the electrode substrate being matched thermally with the solid electrolyte element in a unit cell.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An electrolyte/electrode assembly for a solid electrolyte fuel cell, comprising:

a pair of flat electrodes spaced apart from one another;

a solid electrolyte element sandwiched between said electrodes, said solid electrolyte element being comprised of at least one chemical constituent which provides the solid electrolyte element with a predetermined coefficient of thermal expansion;

a porous matrix having one side and comprising at least one chemical constituent which provides the porous matrix a coefficient of thermal expansion corresponding to the coefficient of thermal expansion of said solid electrolyte element, one of said flat electrodes being formed on or within the one side of said porous matrix; and an electrically conductive material supported in said porous matrix for providing an electrical conductivity in said porous matrix in the direction of thickness of said flat electrodes.

2. The assembly as claimed in claim 1, wherein said porous matrix comprises zirconia which is at least partially stabilized by inclusion therein of one of yttria and magnesia.

3. The assembly as claimed in claim 2, wherein said zirconia has a grain size ranging from about 50 to about 100 μm.

4. The assembly as claimed in claim 3, wherein said porous matrix contains from about 5 to about 40 mole % zirconia.

5. The assembly as claimed in claim 1, wherein said electrically conductive material comprises nickel-zirconia cermet.

6. The assembly as claimed in claim 5, wherein said nickel-zirconia cermet has an average grain size ranging from about 0.1 to about 10 μm.

7. The assembly as claimed in claim 1, wherein said electrically conductive material comprises lanthanum manganite.

8. The assembly as claimed in claim 1, wherein said solid electrolyte element and said porous matrix have chemical constituents which are substantially the same for producing the corresponding coefficient of thermal expansion.

* * * * *